Sept. 17, 1957  A. E. ATKINS  2,806,722
TELESCOPIC SUPPORT
Filed Aug. 19, 1953
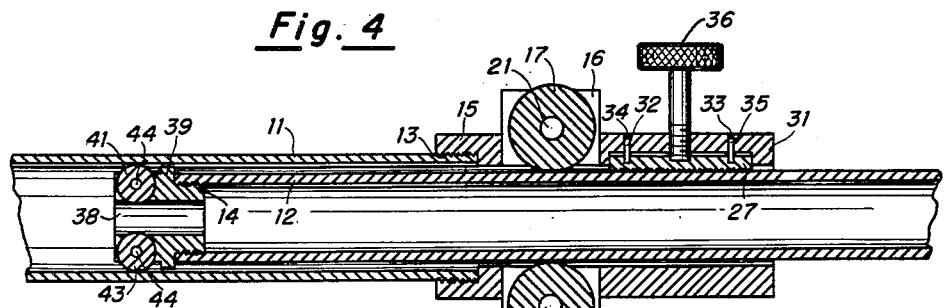
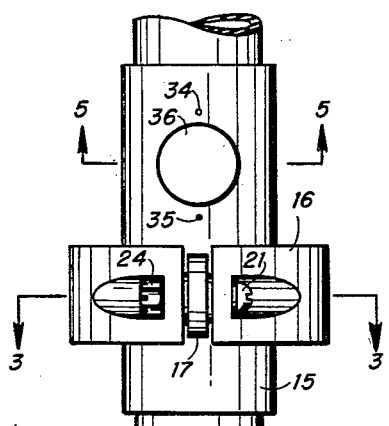
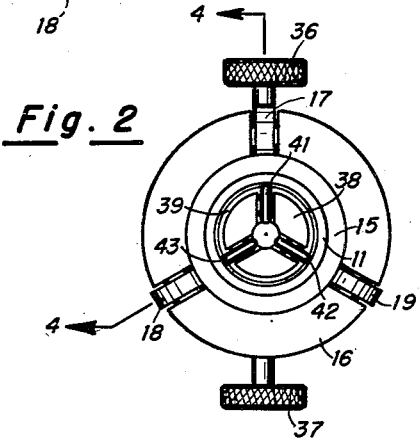
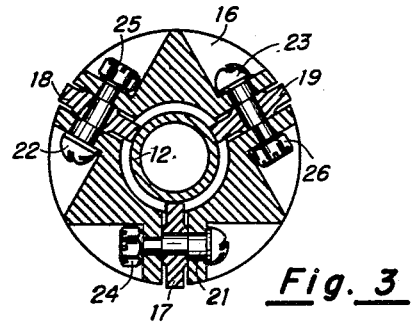
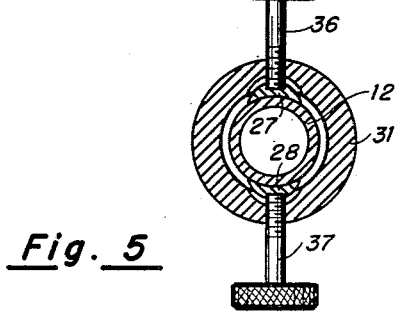
INVENTOR.
ALBERT E. ATKINS
BY George Lipkin
George E. Pearson
ATTORNEYS 2,806,722
Patented Sept. 17, 1957

2,806,722

TELESCOPIC SUPPORT

Albert E. Atkins, El Cajon, Calif.

Application August 19, 1953, Serial No. 375,306

1 Claim. (Cl. 287—58)

(Granted under Title 35, U. S. Code (1952), sec. 266)

The invention described herein may be manufactured and used by or for the Government of the United States of America for governmental purposes without the payment of any royalties thereon or therefor.

This invention relates to telescopic supports and more particularly to a telescoping extender comprising adapters secured on the ends of conventional threaded pipe and specifically adapted to work freely as an under-water support under adverse conditions of corrosion, dirt and adhering marine life.

Many telescoping devices have been utilized for masts, antennas and for various types of supports; however, these are not adapted to work freely under water under various conditions, where dirt and corrosion or marine life tend to interfere with the free sliding of the telescoping sections, since the inner and outer sections of pipe have no guide means other than the close fit. With small clearances the pipes tend to freeze resulting in jamming and delay, when adjustments need to be made on under-water supports which tend to corrode and collect dirt or marine life.

One preferred embodiment of the present invention consists of a pair of telescoping pipe sections selected so that a substantial clearance is provided therebetween for flushing out dirt and providing a free-running clearance to prevent jamming. The two sections are maintained in uniformly spaced relation by a set of inner rollers and a set of outer rollers suitably mounted on threaded adapters inside the end of the inner pipe and on the outside of the end of the outer pipe. The two sections of pipe are secured in any adjusted position by means of a pair of diametrically disposed clamping keys having serrated arcuate inner surfaces formed on the same radius as the inner surface of the outer section of the pipe. The clamping keys are seated in recesses formed in the inner wall of the sleeve mounting the outer rollers and may be forced into engagement with the inner section of pipe by a threaded clamping knob. The outer rollers are preferably mounted on eccentrics so that the rollers may be adjusted to fit different sizes of pipe and also compensate for variations in the outside diameter of the inner pipe due to corrosion and accumulations of dirt and marine life. If desired the inner rollers may also be mounted on eccentrics to provide an adjustment; however, this usually is not necessary, since the wheels on the inner rollers have a rounded edge which cuts into the dirt and the stop collar tends to remove excessive accumulations on the inside of the outer pipe.

One object of the present invention is to provide a telescopic support particularly adapted for supporting an object under water without jamming during the extended use thereof.

Another object of the present invention is to provide a telescopic support which may be adjusted to compensate for variations in size of the inner and outer pipe utilized and to compensate for an increase in the dimensions of the pipes caused by marine growth or dirt and scale resulting from corrosion and under-water use.

A still further object of the present invention is to provide a telescoping support which permits flushing out of any dirt which may accumulate between the inner and outer pipes by providing a relatively large space between the telescopic members.

Other objects and many of the attendant advantages of this invention will be readily appreciated as the same becomes better understood by reference to the following detailed description when considered in connection with the accompanying drawings wherein:

Fig. 1 is an elevational view of one preferred embodiment of the present invention with portions of the pipe broken away to show the structure of the adapters thereon;

Fig. 2 is a bottom view of the device shown in Fig. 1;

Fig. 3 is a sectional view taken on 3—3 of Fig. 1;

Fig. 4 is a sectional view taken on line 4—4 of Fig. 2; and

Fig. 5 is a sectional view taken on line 5—5 of Fig. 1.

Referring now to the drawings in detail, one embodiment of the telescoping support of the present invention consists of two sections of standard pipe 11 and 12 preferably made of a material which will not corrode or deteriorate in water or any other liquid in which it may be utilized. The outer pipe 11 and the inner pipe 12 are provided with conventional threads 13 and 14 respectively.

The outer pipe 11 has a sleeve 15 threaded thereon, the sleeve being provided with a collar 16 of enlarged diameter, and slotted to provide a space for mounting the rollers 17, 18 and 19. The rollers, as shown more clearly in Fig. 3, are mounted on eccentric pins 21, 22 and 23 which may be rotated by a screwdriver or other suitable means inserted in the screw slotted heads thereof to vary the radial position of the rollers. The rollers are secured in adjusted position by tightening the nuts 24, 25, and 26, respectively, on the threaded ends of the pins 21, 22 and 23.

A pair of clamping keys 27 and 28 are mounted in suitable recesses in the outer end 31 of the sleeve 15 and are guided for radial movement therein by pins 32 and 33 slidably mounted in suitable openings 34 and 35. The threaded adjusting knobs 36 and 37 extend through the outer end of the sleeve 31 to engage the clamping keys for forcing them into engagement with the outer surface of the inner pipe 12. Keys 27 and 28 are preferably provided with teeth or a serrated surface, as shown more clearly in Fig. 4, to provide a secure clamping engagement for holding the extensible inner pipe 12 in any desired adjusted position.

The threaded bushing 38 is secured within the end of the inner pipe 12 and is provided with an enlarged collar 39 which engages the inner end of the sleeve 15 which is slightly smaller in diameter than the outer pipe 11 and serves as a stop member to prevent the inner and outer pipes from becoming separated or extending beyond a certain point. The bushing 38 is slotted as shown more clearly in Fig. 2 for mounting the inner rollers 41, 42 and 43 which are supported by pins such as the pin shown at 44 which may be a straight pin or an eccentric pin such as those shown in conjunction with rollers 17, 18 and 19. However, it is not necessary to eccentrically mount the rollers 41, 42 and 43, since they are provided with a rounded surface which cuts into any accumulations of dirt, corrosion and marine life, and the stop collar 39 tends to scrape off any excessive accumulation of dirt on the inner surface of the outer pipe 11.

If desired, a remote control type of locking arrangement may be substituted for the clamping keys 27 and 28 so that the inner section may be released from the surface by a cable controlling a cam arrangement or other suitable means for locking the inner pipe in position. Such an arrangement might be a suitable self-locking cam or eccentric so mounted that the weight of the inner section acting on teeth or a serrated edge will force the cam into locking engagement which may be released by a cable acting through a lever system.

Obviously many modifications and variations of the present invention are possible in the light of the above teachings. It is therefore to be understood that within the scope of the appended claims the invention may be practiced otherwise than as specifically described.

What is claimed is:

A telescopic support comprising inner and outer tubular sections, said outer section having inside dimensions substantially larger than the outside dimensions of said inner section to provide a substantial clearance therebetween, a bushing suitably mounted on one end of said inner section, a set of rollers rotatably mounted in said bushing in position to engage the inner wall of said outer section, a sleeve mounted on said outer section at the opposite end thereof, a set of outer rollers rotatably mounted in said sleeve in position to engage the outer surface of said inner section, said outer rollers being mounted on eccentric pins, and means for securing said eccentric pins in any desired position whereby said rollers may be adjusted radially to compensate for variations in the dimensions of said inner section, said bushing being provided with an enlarged collar of slightly less diameter than the inside dimensions of the outer section and relative movement of said tubular members with respect to each other causes said enlarged collar to remove accumulation from the inside of said outer member, said enlarged collar serving in conjunction with said sleeve as stop means for extended relative movement therebetween of said tubular members.

References Cited in the file of this patent
UNITED STATES PATENTS

| | | |
|---|---|---|
| 295,519 | Bonner | Mar. 25, 1884 |
| 415,065 | Rung | Nov. 12, 1889 |
| 519,234 | Cardarelli | May 1, 1894 |
| 564,741 | Dunn | July 28, 1896 |
| 744,701 | Pederson | Nov. 17, 1903 |
| 1,138,799 | Scott | May 11, 1915 |
| 1,198,869 | Pierce | Sept. 19, 1916 |
| 1,222,915 | Anderson | Apr. 17, 1917 |
| 1,261,650 | Thomas et al. | Apr. 2, 1918 |
| 1,355,946 | Dietrich et al. | Oct. 19, 1920 |
| 1,541,791 | Christofferson | June 16, 1925 |
| 1,951,754 | Gilbert | Mar. 20, 1934 |
| 2,483,396 | Benson | Oct. 4, 1949 |
| 2,587,511 | Nerman | Feb. 26, 1952 |
| 2,602,863 | Raymond et al. | July 8, 1952 |
| 2,619,995 | Gordon | Dec. 2, 1952 |

FOREIGN PATENTS

| | | |
|---|---|---|
| 399,084 | Italy | Oct. 16, 1942 |